United States Patent [19]

Jacobson et al.

[11] Patent Number: 4,721,558

[45] Date of Patent: Jan. 26, 1988

[54] HYDROTREATING CATALYSTS COMPRISING A MIXTURE OF A SULFIDE OF A PROMOTER METAL AMORPHOUS SULFIDE OF TRIVALENT CHROMIUM AND MICROCRYSTALLINE MOLYBDENUM OR TUNGSTEN SULFIDE

[75] Inventors: Allan J. Jacobson, Princeton; Teh C. Ho, Bridgewater; Russell R. Chianelli, Somerville; John J. Steger, Pittstown; Angelo A. Montagna, Summit; all of N.J.

[73] Assignee: Exxon Research and Engineering Company, Florham Park, N.J.

[21] Appl. No.: 871,152

[22] Filed: May 30, 1986

Related U.S. Application Data

[63] Continuation of Ser. No. 656,088, Sep. 28, 1984, abandoned, which is a continuation-in-part of Ser. No. 567,882, Jan. 3, 1984, abandoned, which is a continuation of Ser. No. 454,384, Dec. 29, 1982, abandoned.

[51] Int. Cl.$^4$ .................. C10G 45/08; C10G 45/60; C10G 47/06
[52] U.S. Cl. .................. 208/108; 208/215; 208/216 R; 208/254 H
[58] Field of Search ........... 208/108, 112, 215, 216 R, 208/254 H; 502/219, 220, 221

[56] References Cited

U.S. PATENT DOCUMENTS

| | | | |
|---|---|---|---|
| 2,885,349 | 5/1959 | Hansford | 208/109 |
| 3,046,218 | 7/1962 | Henke et al. | 208/109 |
| 3,265,615 | 8/1966 | Buss | 502/219 |
| 4,181,602 | 1/1980 | Quick et al. | 502/220 |
| 4,591,429 | 5/1986 | Ho et al. | 208/254 H |
| 4,626,339 | 12/1986 | Chianelli et al. | 208/18 |

OTHER PUBLICATIONS

Konings et al., "Hydrodesulfurization Catalysis...", *J. Catalysis*, 76, 466–472, (1982).
Konigs et al., "An ESR Study on the Stability of Dithiomolybdate...", *J. Catalysis*, 76, 473–476, (1982).
McCarty et al., 8th Intn'l. Cong. on Cat., W. Berlin, Germany (Jul. 1984) pp. IV-427–439.

*Primary Examiner*—Olik Chaudhuri
*Attorney, Agent, or Firm*—Joseph J. Dvorak

[57] ABSTRACT

A composition of matter comprising a mixture of (i) a sulfide of at least one promoter metal selected from the group consisting of Ni, Co, Mn, Cu, Zn and mixture thereof and mixtures thereof with Fe, (ii) an amorphous sulfide of trivalent chromium and (iii) microcrystallites of metal sulfide of a metal selected from the group consisting of molybdenum, tungsten and mixture thereof. These compositions have been found to be useful hydrotreating catalysts having nitrogen removal activity superior to that of commercial catalysts such as cobalt-molybdate on alumina.

27 Claims, No Drawings

HYDROTREATING CATALYSTS COMPRISING A MIXTURE OF A SULFIDE OF A PROMOTER METAL AMORPHOUS SULFIDE OF TRIVALENT CHROMIUM AND MICROCRYSTALLINE MOLYBDENUM OR TUNGSTEN SULFIDE

This application is a continuation of application Ser. No. 656,088 filed 9/28/84 which is a continuation-in-part application of Ser. No. 567,882 filed Jan. 3, 1984, which is a continuation of application Ser. No. 454,384 filed Dec. 29, 1982, all now abandoned.

BACKGROUND OF THE INVENTION

Field of the Invention

A composition of matter comprising a mixture of (i) a sulfide of at least one promoter metal selected from the group consisting of Ni, Co, Mn, Cu, Zn and mixture thereof, (ii) an amorphous sulfide of trivalent chromium and (iii) microcrystallites of metal sulfide of a metal selected from the group consisting of molybdenum, tungsten and mixture thereof. This composition may also contain iron sulfide. Still further this invention relates to useful hydro-processing catalysts, their preparation and use, said catalysts comprising a mixture of (i) a sulfide of at least one promoter metal selected from the group consisting of Ni, Co, Mn, Cu, Zn and mixture thereof, (ii) an amorphous sulfide of trivalent chromium and (iii) microcrystallites of metal sulfide of a metal selected from the group consisting of molybdenum, tungsten and mixture thereof.

BACKGROUND OF THE DISCLOSURE

The petroleum industry is increasingly turning to heavy crudes, resids, coals and tar sands as sources for future feedstocks. Feedstocks derived from these heavy materials contain more sulfur and nitrogen than feedstocks derived from more conventional crude oils. These feeds therefore require a considerable amount of upgrading in order to obtain usable products therefrom, such upgrading or refining generally being accomplished by hydrotreating processes which are well-known in the petroleum industry.

These processes require the treating with hydrogen of various hydrocarbon fractions, or whole heavy feeds, or feedstocks, in the presence of hydrotreating catalysts to effect conversion of at least a portion of the feeds, or feedstocks to lower molecular weight hydrocarbons, or to effect the removal of unwanted components, or compounds, or their conversion to innocuous or less undesirable compounds. Hydrotreating may be applied to a variety of feedstocks, e.g., solvents, light, middle, or heavy distillate feeds and residual feeds, or fuels. In hydrotreating relatively light feeds, the feeds are treated with hydrogen, often to improve odor, color, stability, combustion characteristics, and the like. Unsaturated hydrocarbons are hydrogenated. Sulfur and nitrogen are removed in such treatments. In the hydrodesulfurization (HDS) of heavier feedstocks, or residua, the sulfur compounds are hydrogenated and cracked. Carbon-sulfur bonds are broken, and the sulfur for the most part is converted to hydrogen sulfide which is removed as a gas from the process. Hydrodenitrogenation (HDN), to some degree also generally accompanies hydrodesulfurization reactions. In the hydrodenitrogenation of heavier feedstocks, or residua, the nitrogen compounds are hydrogenated and cracked. Carbon-nitrogen bonds are broken, and the nitrogen is converted to ammonia and evolved from the process. Hydrodesulfurization, to some degree also generally accompanies hydrodenitrogenation reactions. In the hydrodesulfurization of relatively heavy feedstocks, emphasis is on the removal of sulfur from the feedstock. In the hydrodenitrogenation of relatively heavy feedstocks emphasis is on the removal of nitrogen from the feedstock. Albeit, hydrodesulfurization and hydrodenitrogenation reactions generally occur together, it is usually far more difficult to achieve effective hydrodenitrogenation of feedstocks than hydrodesulfurization of feedstocks.

Catalyst precursors most commonly used for these hydroreating reactions include materials such as cobalt, molybdate on alumina, nickel on alumina, cobalt molybdate promoted with nickel, nickel tungstate, etc. Also, it is well-known to those skilled in the art to use certain transition metal sulfides such as cobalt and molybdenum sulfides and mixtures thereof to upgrade oils containing sulfur and nitrogen compounds by catalytically removing such compounds in the presence of hydrogen, which processes are collectively known as hydrotreating or hydrorefining processes, it being understood that hydrorefining also includes some hydrogenation of aromatic and unsaturated aliphatic hydrocarbons. Thus, U.S. Pat. No. 2,914,462 discloses the use of molybdenum sulfide for hydrodesulfurizing gas oil and U.S. Pat. No. 3,148,135 discloses the use of molybdenum sulfide for hydrorefining sulfur and nitrogen-containing hydrocarbon oils. U.S. Pat. No. 2,715,603, discloses the use of molybdenum sulfide as a catalyst for the hydrogenation of heavy oils. Molybdenum and tungsten sulfides have other uses as catalysts in reactions such as hydrogenation, methanation and water gas shift.

In general, with molybdenum and other transition metal sulfide catalysts as well as with other types of catalysts, higher catalyst surface areas result in more active catalysts than similar catalysts with lower surface areas. Thus, those skilled in the art are constantly trying to achieve catalysts that have higher surface areas. More recently, it has been disclosed in U.S. Pat. Nos. 4,243,553 and 4,243,554 that molybdenum sulfide catalysts of relatively high surface area may be obtained by thermally decomposing selected thiomolybdate salts at temperatures ranging from 300°–800° C. in the presence of essentially oxygen-free atmospheres. Suitable atmospheres are disclosed as consisting of argon, a vacuum, nitrogen and hydrogen. In U.S. Pat. No. 4,243,554 an ammonium thiomolybdate salt is decomposed by heating at a rate in excess of 15° C. per minute, whereas in U.S. Pat. No. 4,243,553, a substituted ammonium thiomolybdate salt is thermally decomposed at a very slow heating rate of from about 0.5° to 2° C./min. The processes disclosed in these patents are claimed to produce molybdenum disulfide catalysts having superior properties for water gas shift and methanation reactions and for catalyzed hydrogenation or hydrotreating reactions.

Catalysts comprising molybdenum sulfide in combination with other metal sulfides are also known. Thus, U.S. Pat. No. 2,891,003 discloses an iron-chromium combination for desulfurizing olefinic gasoline fractions; U.S. Pat. No. 3,116,234 discloses Cr-Mo and also Mo with Fe and/or Cr and/or Ni for HDS; U.S. Pat. No. 3,265,615 discloses Cr-Mo for HDN and HDS; U.S. Pat. No. 3,245,903 discloses Fe-Mo and Fe-Co-Mo for lube oil refining; U.S. Pat. No. 3,459,656 discloses Ni-Co-Mo for HDS; U.S. Pat. No. 4,108,751 discloses Fe- Ni-Mo for HDN and U.S. Pat. No. 4,171,258 discloses Fe-Cr-Mo for HDS with steam.

SUMMARY OF THE INVENTION

The present invention relates to new compositions of matter comprising a mixture of (i) a sulfide of at least one promoter metal selected from the group consisting of Ni, Co, Mn, Cu, Zn and mixture thereof, (ii) amorphous sulfide of trivalent chromium and (iii) microcrystallites of metal sulfude of a metal selected from the group consisting of molybdenum, tungsten, and mixture thereof. These compositions may also contain iron sulfide and are useful as hydroproessing catalysts such as hydrotreating catalysts. By amorphous is meant a compound which exhibits no detectable crystallinity when measured by X-ray diffraction. By microcrystallites of tungsten or molybdenum sulfide is meant crystals whose major dimensions are less than about 0.1 microns by 0.01 microns, preferably less than about 0.05 microns by 0.01 microns and still more preferably less than 0.015 microns by 0.005 microns. It should be noted that a composition of this invention cannot contain iron sulfide alone as a promoter metal sulfide. If iron sulfide is present, then at least one other promoter metal sulfide must also be present.

These catalysts are obtained by heating one or more catalyst precursors under oxygen-free conditions, preferably in the presence of excess sulfur, at a temperature of at least about 200° C. for a time sufficient to form said catalyst. The catalyst precursor will comprise a mixture of (i) a hydrated oxide of trivalent chromium and (ii) a thiometallate salt of the general formula (ML) (Mo$_y$W$_{1-y}$S$_4$) wherein M is one or more divalent promoter metals selected from the group consisting of Ni, Co, Mn, Cu, Zn and mixtures thereof, wherein y is any value ranging from 0 to 1, and wherein L is one or more, neutral, nitrogen-containing ligands at least one of which is a chelating polydentate ligand. The total denticity of said ligands will generally be about six. M can also be a mixture of Fe and at least one additional promoter metal.

In a preferred embodiment ligand L will have a denticity of six and will be three bidentate or two tridentate chelating amines and the oxygen-free conditions will comprise a gaseous mixture of hydrogen and hydrogen sulfide. Some of these catalysts have hydrotreating or hydrorefining activities substantially greater than that of conventional hydrotreating catalysts such as those prepared from cobalt molybdate on alumina, even though their surface areas are not as high.

Hydroprocessing catalyst is meant to include catalysts useful for any process that is carried out in the presence of hydrogen, including, but not limited to, hydrocracking, hydrodenitrogenation, hydrodesulfurization, hydrogenation of aromatic and aliphatic unsaturated hydrocarbons, methanation, water gas shift reactions, etc. These reactions include hydrotreating and hydrorefining reactions, the difference generally being thought of as more of a difference in degree than in kind, with hydrotreating conditions being more severe than hydrorefining conditions.

DETAILED DESCRIPTION OF THE INVENTION

As set forth above, the compositions of this invention comprise a mixture of (i) a sulfide of at least one promoter metal selected from the group consisting of Ni, Co, Mn, Cu, Zn and mixture thereof, and mixture thereof with Fe, (ii) amorphous sulfide of trivalent chromium and (iii) microcrystallites of metal sulfide of a metal selected from the group consisting of molybdenum, tungsten and mixture thereof.

Thus, Electron microscope and other analytical techniques have revealed that the size of the molybdenum and/or tungsten microcrystallites will generally have dimensions less than about 0.1 microns by 0.01 microns. In a preferred embodiment the microcrystallite sizes will be less than about 0.05 microns by 0.01 microns and still more preferably less than 0.015 microns by 0.005 microns.

Compositions of this invention were analyzed using X-ray diffraction (XRD). Those skilled in the art are well-acquainted with this technique in which a monochromatic X-ray beam impinges on the sample. Samples of the catalysts were ground to a fine powder and packed into an aluminum tray with a cylindrical recess 25 mm in diameter and 1 mm in depth. The top surface of the sample was flat and co-planar with the top of the aluminumm tray after this preparation. Measurements were made in ambient atmosphere using a Siemens D500 X-ray diffractometer in 0-2$\theta$ reflection (Bragg-Brentano) geometry. The incident X-ray beam was taken from a fixed anode copper target with a wavelength of 1.54178 A. The diffracted beams were monochromated using a graphite monochromater to minimize fluorescence and were detected using a proportional counter detector. Data were collected by stepping the detector in angular increments of 0.02° 2$\theta$ and counting at each step for two seconds.

Compositions of this invention used as hydrotreating catalysts were analyzed using XRD both fresh, that is right after formation, and after being on stream for three days. There was no discernable difference in the X-ray diffraction patterns between the fresh and used catalysts. The diffraction patterns obtained were consistent with MoS$_2$ microcrystallites of the size observed by the elctron microscope. The X-ray diffraction patterns all contained a broad peak between approximately 10° and 15° 2$\theta$ which is indicative of stacks of MoS$_2$ crystallites with a stack number of about 4. There was no evidence in the X-ray diffraction (XRD) pattern for any crystalline chromium sulfide phase.

Compositions of this invention examined in an electron microscope at a magnification of 680,000X with an electron microscope having a 4 Å point-to-point resolution. Examination of micrographs of these compositions revealed many lines 6.2 A apart and generally not more than 150 Å in length. It is well known in the art (see for example R. R. Chianelli, International Reviews in Physical Chemistry, (1982), 2(127–165) that such lines with the 6.2 Å spacings are characteristic of MoS$_2$. MoS$_2$ occurs in layers which are seen to be highly disordered and occurring singly or stacked but in the micrograph the degree of stacking is generally not more than eight stacks and usually not more than four stacks. The Cr$_2$S$_3$ phase was observed to be completely amorphous. In some cases a small amount of crystalline Cr$_2$S$_3$ phase was detected, but only as a minority phase, less than about 5%. The predominant material which is the catalytially active composition of this invention is a mixture of (a) microcrystalline MoS$_2$, WS$_2$ or mixture thereof, (b) amorphous Cr$_2$S$_3$ and (c) a sulfide of at least one promoter metal.

As hereinbefore stated, the catalysts of this invention may be prepared from one or more catalyst precursors which will comprise a mixture of (i) a hydrated oxide of trivalent chromium and (ii) a thiometallate salt of the general formula $(ML)(Mo_yW_{1-y}S_4)$ wherein M is one or more divalent promoter metals selected from the group consisting of Ni, Co, Mn, Cu, Zn mixtures thereof, and mixtures thereof with Fe wherein y is any value ranging from 0 to 1 and L is one or more neutral, nitrogen-containing ligands at least one of which is a chelating polydentate ligand. The total denticity of the ligands used to form the precursor compound will be about six.

If desired, more molybdenum and/or tungsten sulfide may be incorporated into the precursor, and concomitantly the composition of this invention, by also including in the precursor mixture a thiometallate salt of the general formula $(L')(Mo_yW_{1-y}S_4)$ wherein y is as above and L' is the conjugate acid of one or more ligands, L, with a charge sufficient to balance the dinegative charge of the thiometallate anion. In such a case the precursor will comprise a mixture of (i) a hydrated oxide of trivalent chromium, (ii) a thiometallate salt containing the desired divalent promoter metal of the formula $(ML)(Mo_yW_{1-y}S_4)$ and (iii) a thiometallate salt of the formula $(L')(Mo_yW_{1-y}S_4)$.

The divalent promoter metal may be a single metal such as Ni in which case the promoter metal containing thiometallate salt would have the formula $(NiL)(Mo_yW_{1-y}S_4)$. Alternatively the promoter metal may be a mixture of two or three promoter metals. For the case of two promoter metals, such as Ni and Co, the thiometallate salt would have the formula $[(Ni_aCo_{1-a})L](Mo_yW_{1-y}S_4)$ wherein $0 < a < 1$. In the case of three promoter metals such as Ni, Co and Fe, the thiometallate salt would have the formula of the form $[(Ni_aCo_bFe_c)L](Mo_yW_{1-y}S_4)$ wherein $0 < a$, b or $c < 1$ and $a+b+c=1$.

Ligand L will be one or more neutral, nitrogen containing ligands wherein at least one of said ligands is a multidentate chelating ligand wherein the total denticity of the ligands adds up to six. The ligand chelates the divalent promoter metal cation to form a chelated divalent promoter metal cation $[ML]^{2+}$. Thus, the metal sulfide anion $(Mo_yW_{1-y}S_4)^{2-}$ will be ionically bound to the chelated divalent promoter metal cation $[ML]^{2+}$. By neutral is meant that the ligand itself does not have a charge. In its conjugate acid form the ligand forms a chelating cation $[L']^{2+}$ which is ionically bound to the metal sulfide anion.

Those skilled in the art know that the term "ligand" is used to designate functional coordinating groups which have one or more pairs of electrons available for the formation of coordinate bonds. Ligands that can form more than one bond with a metal ion are called polydentate while ligands that can form only one bond with a metal ion are called monodentate. Monodentate ligands are not capable of forming chelates. Hence, if one uses one or more species of monodentate ligands in the precursor molecule, then one must also use more than one polydentate chelating ligand. Preferably L will be one or more polydentate chelating ligands. The total denticity of the ligand species comprising L will be six. Thus, L will be three bidentate ligands, two tridentate ligands, a mixture of a bidentate and a quadridentate ligand, a hexadentate ligand or a mixture of a polydentate ligand with monodentate ligands as long as the combination has a total denticity of six. As has heretofore been stated, it is preferred to use chelating bidentate and tridentate alkylamine ligands. In general, the ligands useful in this invention include alkyl and aryl amines and nitrogen heterocycles. Illustrative but non-limiting examples of ligands useful in the catalyst precursors of this invention are set forth below.

Monodentate ligands will include $NH_3$ as well as alkyl and aryl amines such as ethylamine, dimethyl amine, o-phenylene diamine and nitrogen heterocyclic amines such as pyridine, etc. Useful chelating bidentate amine ligands are illustrated by ethylenediamine, 2,2'-bipyridine, o-phenylene diamine, tetramethylethylenediamine and propane-1,3 diamine. Similarly, useful chelating tridentate amine ligands are represented by terpyridine and diethylenetriamine while triethylenetetramine is illustrative of a useful chelating quadridentate amine ligand. Useful chelating pentadentate ligands include tetraethylene pentamine while sepulchrate (an octazacryptate) is illustrative of a suitable chelating hexadentate ligand. As a practical matter it will be preferred to use chelating, polydentate alkyl amines. Illustrative, but not limiting examples of alkyl amines that are useful in the catalyst precursor of this invention include ethylenediamine, diethylenetriamine, and tetraethylenetetramine. It is particularly preferred to use bidentate and tridentate alkyl amines such as ethylenediamine, (en), and diethylenetriamine, (dien).

The conjugate acid of ligand L, referred to as L', will have a charge sufficient to balance the dinegative charge of the thiometallate anion. For example, if L is ethylenediamine (en), L' will be $[H_2en]$ and the corresponding thiomolybdate salt, for example, will be $[H_2en]_3(MoS_4)$. For diethylene triamine, (dien), the corresponding salt will be $[H_2dien]_2(MoS_4)$.

In general, the precursors useful for forming the compositions of this invention may be prepared by mixing a slurry of (i) a hydrated oxide of trivalent chromium $Cr(OH)_3 \cdot xH_2O$, with (ii) one or more of the promoter metal and ligand containing thiometallate salts and, optionally, (iii) one or more thiometallate salts of Mo and/or W containing the conjugate acid of one or more ligands, but no divalent promoter metal. The thiometallate salt is then precipitated onto the slurried particles of hydrated chromium oxide and the precursor is recovered. The hydrated chromium oxide may be freshly precipitated from an aqueous solution of a trivalent chromium salt. Alternatively, the source of hydrated chromic oxide may be a sol or colloidal, aqueous suspension of same. In one method of preparation the hydrated chromium oxide will be precipitated from an aqueous solution of trivalent chromium salt by contacting said salt solution with one or more basic amine chelating agents.

In one embodiment a water soluble trivalent chromium compound and divalent metal salt are dissolved in water and hydrated chromium oxide is precipitated by addition of a ligand, L or a mixture of ligands, L. This procedure produces a slurry or suspension of very fine particles of a hydrated oxide of trivalent chromium in the aqueous phase, which also contains some free ligand L, and some of the conjugate acid of the ligand L, L'. When the conjugate acid is a strong acid, that is if the ligand L is a weak base, than a quantity of ammonium hydroxide may be added to precipitate the chromium. The water soluble chromium salt may be any water soluble salt that is convenient to use such as halide, sulfate, nitrate, etc. Sufficient ligand L is added to form the water soluble chelated promoter metal cations $[ML]^{2+}$. This suspension of hydrated chromium oxide containing $[ML]^{2+}$ in solution is then mixed with a solution of the thiometallate prepared by dissolving ammonium thiometallate in an excess of the ligand or mixture of ligands. A small amount of water may be added if desired. On mixing the slurry with the thiometallate solution an orange-red colored precipitate or the catalyst precursor forms which is recovered by filtration. This precipitate will be a precursor of a composition of this invention.

In another embodiment the thiometallate salts $(ML)(Mo_yW_{1-y}S_4)$ and $(L')(Mo_yW_{1-y}S_4)$ may be prepared separately and mixed separately or together with the hydrated chromium oxide slurry prepared as described above.

The salts $(L')(Mo_yW_{1-y}S_4)$ may generally be prepared by dissolving the ammonium thiometallate in excess of the ligand L. The salt is recovered as a precipitate by addition of water or some other suitable antisolvent such as methanol or acetone. Many of the thiometallate salts $(ML)(Mo_yW_{1-y}S_4)$ and methods for preparing them are known in the art. An article by Diemann and Mueller titled Thio and Seleno Compounds of The Transition Metals with d° Configuration published in COORD. CHEM. REV. 10:79-122 provides a review of known promoted thiometallate salts useful for preparing the compositions of this invention. In general, these salts may be prepared by mixing an aqueous solution of ammonium thiomolybdate and/or thiotungstate with an aqueous solution of the chelated promoter metal cation $[ML]^{2+}$ which results in the formation of the salt as a precipitate which is readily recovered. The chelated promoter cation is easily formed by, for example, mixing an aqueous solution of one or more water soluble promoter metal salts with the ligand. The water soluble salt may be any water soluble salt that is convenient to use such as a halide, sulfate, perchlorate, acetate, nitrate, etc. Alternatively, an aqueous solution of ammonium thiomolybdate and/or tungstate may be mixed with an aqueous solution of the chelated promoter metal salt or the salt can be added to the ligand and dissolved into the solution of thiomolybdate and/or thiotungstate.

The compositions or catalysts of this invention will be prepared by heating one or more catalyst precursors, in an oxygen-free environment and in the presence of sulfur, at a temperature of at least about 200° C. for a time sufficient to form the catalyst. Although the sulfur required during the formation of the catalyst may be present in the precursor, it is preferred that the sulfur be present in an amount in excess of that contained in the precursor. Thus, it is preferred that the composition be formed by heating the precursor in the presence of sulfur or, preferably, in the presence of a sulfur bearing compound. Mixtures of hydrogen and $H_2S$ have been found to be particularly suitable. Preferably the temperature will range between from about 250°–600° C., more preferably from about 250°–500° C. and still more preferably from about 300°–400° C. The oxygen-free environment may be gaseous, liquid or mixture thereof.

As discussed under Background of the Disclosure, molybdenum and tungsten sulfide catalysts have many uses, including hydrotreating. Hydrotreating conditions vary considerably depending on the nature of the hydrocarbon being hydrogenated, the nature of the impurities or contaminants to be reacted or removed, and, inter alia, the extent of conversion desired, if any. In general however, the following Table illustrates typical conditions for hydrotreating a naphtha boiling within a range of from about 25° C. to about 210° C., a diesel fuel boiling within a range of from about 170° to 350° C., a heavy gas oil boiling within a range of from about 325° C. to about 475° C., a lube oil feed boiling within a range of from about 290° to 550° C., or residuum containing from about 10 percent to about 50 percent of a material boiling above about 575° C.

| | Typical Hydrotreating Conditions | | | |
|---|---|---|---|---|
| Feed | Temp., °C. | Pressure psig | Space Velocity V/V/Hr | Hydrogen Gas Rate SCF/B |
| Naptha | 100–370 | 150–800 | 0.5–10 | 100–2000 |
| Diesel | 200–400 | 250–1500 | 0.5–4 | 500–6000 |
| Heavy Gas Oil | 260–430 | 250–2500 | 0.3–2 | 1000–6000 |
| Lube Oil | 200–450 | 100–3000 | 0.2–5 | 100–10,000 |
| Residuum | 340–450 | 1000–5000 | 0.1–1 | 2000–10,000 |

It should be noted that the compositions of this invention are useful catalysts for lube oil refining processes where it is desirable to remove oxidation initiating nitrogen compounds from lube oil feeds.

The invention will be further understood by reference to the following examples.

EXAMPLES

Example 1

Precursor Preparation

Precursor A

A precursor comprising hydrated chromium hydroxide and a nickel promoted thiomolybdate was prepared by dissolving ammonium thiomolybdate into diethylenetriamine (dien) and the resulting dark red solution cooled to 0° C. in an ice bath. An aqueous solution of a mixture of chromium and nickel chloride was slowly added, in aliquots, to the dark red solution, with agitation after the addition of each aliquot. An orange precipitate was formed and recovered by vacuum filtration. More specifically, 40 grams of $(NH_4)_2MoS_4$ was added to 82 ml of diethylenetriamine (dien) in a one liter flask. Distilled $H_2O$ was used twice to wash off any solution remaining on the sides of the flask. The resulting dark red solution was cooled to 0° C. in an ice bath and kept in the bath for the duration of the preparation. In a separate flask 16.52 grams of $CrCl_3.6H_2O$ and 14.77 gm of $NiCl_2.6H_2O$ were dissolved into a mixture of 250 ml of distilled $H_2O$ and 25 ml of diethylenetriamine to precipitate the hydrated chromium oxide and to chelate the nickel ion. This slurry was allowed to stand for 2–3 hours after which it was slowly added dropwise, to the cold $(NH_4)_2MoS_4$/dien solution with agitation after each addition keeping the flask as cold as possible, which resulted in a bright orange precipitate being formed. The resulting precipitate-containing mixture was stirred in the ice bath for one half hour after the addition was completed. The ppt. was separated out by vacuum filtration through a Buchner funnel. The catalyst precursor product was washed with distilled water, then with ethanol, and dried under vacuum for 16–24 hrs. Eighty three grams of orange colored precipitate, Precursor A, were recovered.

Precursor B

A chromium-nickel thiomolybdate precursor was prepared in a similar manner by dissolving 40 grams of ammonium thiomolybdate into 82 ml of ethylenediamine in a 1 liter flask which was cooled to 0° C. in a wet ice bath. In a separate flask, 9.98 grams of $NiCl_2.6$-

$H_2O$ and 36.72 grams of $Cr(NO_3)_3 \cdot 7H_2O$ were dissolved in 300 ml of water and 25 ml of ethylenediamine added thereto which resulted in formation of a precipitate. The resulting slurry was allowed to stand for 2-3 hours after which it was then slowly added, dropwise, to the chilled $(NH_4)MoS_4$/en solution, with agitation, which resulted in an orange precipitate. The mixture was then stirred in the ice bath for one half hour and recovered as was the precipitate in the other examples. This product was designated Precursor B.

Precursor C

A chromium-cobalt thiomolybdate catalyst precursor was prepared in a similar manner by dissolving 40 grams of $(NH_4)_2MoS_4$ in 82 ml of diethylenetriamine in a one liter flask which formed a dark red solution. The sides of the flask were washed with distilled water and the flask cooled to 0° C. in a wet ice bath and kept in the bath for the duration of the experiment. In a separate flask a mixture of 16.52 grams of $CrCl_3 \cdot 6H_2O$ and 14.78 grams of $CoCl_2 \cdot 6H_2O$ were dissolved in 250 ml of distilled water. To this solution was added 25 ml of dien to form a precipitate. The resulting slurry was allowed to stand for 2-3 hours and then slowly added (dropwise) to the $(NH_4)_2MoS_4$/dien solution with agitation, which formed a bright orange precipitate. The resulting precipitate/solution was stirred in the ice bath for a half hour after the reaction was completed.

The precipitate was then separated by vacuum filtration and washed with water and ethanol and then dried under vacuum. Eighty-three grams of orange colored solid, Precursor C, were recovered.

Precursor D

Another chromium-nickel thiomolybdate catalyst precursor was prepared as follows:

An aqueous suspension of colloidal chromia, 163.1 g, containing 22 wt.% $Cr_2O_3$, was dispersed in 400 cc of water, and placed in a 2000 cc flask. With constant agitation, a solution of 14 g $NiCl_2 \cdot 6H_2O$ and 34.6 g of ethylenediamine in 75 cc of water was added to the flask dropwise via a separatory funnel. A purple gel formed, to which a solution of 15.4 g $(NH_4)_2MoS_4$ in 100 cc water and 50 cc ethylenediamine was slowly added, dropwise with constant agitation. An orange-red precipitate was formed, characteristic of $Ni(en)_3MoS_4$. The resultant precipitate was recovered by vaccum filtration through a Buchner funnel, dried under vacuum at 50° C., producing Precursor D.

Precursor E

A chromium-nickel thiotungstate catalyst precursor was prepared in a manner similar to Precursor D except for the following change:

The amount of colloidal chromia suspension was 147.6 g; the nickel solution contained 12.6 g $NiCl_2 \cdot 6H_2O$ and the precipitating solution consisted of 18.5 g $(NH_4)_2WS_4$ in 100 cc water and 50 cc ethylene-diamine. This procedure formed Precursor E.

Catalyst Preparation

The precursors were pelletized using a 4% aqueous solution of polyvinyl alcohol as a binder. Each pelletized precursor was loaded into a stainless steel reactor and purged for one hour under nitrogen at 100° C. and atmospheric pressure. Ten percent of hydrogen sulfide in hydrogen was introduced into the reactor at a rate of 0.75 SCF/hr for each 10 cc of catalyst in the reactor.

The temperature in the reactor was then raised to 325° C. and held at this temperature for three hours to form a catalyst composition of this invention after which the temperature in the reactor was lowered to 100° C., the $H_2S/H_2$ gas flow was stopped and the reactor was purged with nitrogen and allowed to cool to room temperature.

Elemental analyses of the catalysts or compositions of this invention formed by sulfiding Precursor A described above are set forth below in wt.%.

| Precursor | Cr | Mo | Ni | S | C | H | N |
|---|---|---|---|---|---|---|---|
| A: | 10.34 | 24.51 | 12.45 | 31.93 | 6.81 | 1.26 | 0.11 |

The catalyst based on Precursor A had been run on oil in a reactor for three days prior to analysis.

Reaction Conditions

About 20 g of the catalyst was loaded into a fixed-bed reactor. Hydrotreating was carried out at the conditions set forth below:
Temperature: 325° C.
Pressure: 3.15 MPa
Hydrogen rate: 3000 SCF/bbl
LHSV: 3.0, 4.0 V/V/Hr.

Liquid product was analyzed for total sulfur by X-ray fluorescence and for nitrogen by combustion analysis. The feedstock used was a light catalytic cycle oil (LCCO) that was about 20 wt.% paraffinic having nominal properties set forth in Table 1.

Hydrotreating Experiments

In all of these experiments, the results obtained from the catalyst compositions of this invention were compared to results obtained from a commercial hydrotreating catalyst comprising nickel molybdate on $-Al_2O_3$. This catalyst contained 18 percent molybdenum oxide and 3.5 percent nickel oxide supported on gamma alumina. The commercial catalyst was sulfided employing the same procedure used to form the catalysts of this invention, except that the temperature was 360° C. for one hour.

The results of these experiments are shown in Tables 2 through 6 and show that the catalysts of this invention are not only useful hydrotreating catalysts but have higher selectivity for hydrodenitrogenation than the commercial nickel molybdate on alumina catalyst.

TABLE 1

| LCCO Feed | |
|---|---|
| Gravity (°API) | 18.6 |
| Sulfur, wt. % | 1.4 |
| Nitrogen, ppm | 292 |
| GC distillation | |
| Wt. % | Temp., °C. |
| 5 | 231 |
| 10 | 251 |
| 50 | 293 |
| 70 | 321 |
| 90 | 352 |
| 95 | 364 |

TABLE 2

Hydrotreating Activity for Commercial Nickel Molybdate on Alumina*

| Catalyst Hours on Stream | % HDS | % HDN |
|---|---|---|
| 49 | 80.0 | 32.3 |
| 71 | 80.8 | 38.6 |
| 75 | 80.0 | 37.6 |

*LHSV 3.0

TABLE 3

**Hydrotreating Activity for Catalyst Prepared* From Chromium-Nickel Thiomolybdate Precursor B Prepared With Ethylenediamine**

| Catalyst Hours on Stream | % HDS | % HDN |
|---|---|---|
| 39 | 79.2 | 89.1 |
| 57 | 82.5 | 91.6 |
| 62 | 82.5 | 93.2 |

*LHSV 4.0

TABLE 4

Hydrotreating Activity of Catalyst Prepared From Cobalt-Chromium Thiomolybdate Precursor C*

| Catalyst Hours on Stream | % HDS | % HDN |
|---|---|---|
| 42 | 70.8 | 34.6 |
| 46 | 80.6 | 35.5 |
| 65 | 72.7 | 34.3 |

*LHSV 4.0

TABLE 5

Hydrotreating Activity For Catalyst Prepared From a Nickel-Chromium Thiomolybdate Precursor D*

| Catalyst Hours on Stream | % HDS | % HDN |
|---|---|---|
| 44 | 51 | 50.9 |

*LHSV 3.0

TABLE 6

Hydrotreating Activity For Catalyst Prepared From Nickel-Chromium Thiotungstate Precursor E*

| Catalyst Hours on Stream | % HDS | % HDN |
|---|---|---|
| 48 | 61.7 | 58.8 |

*LHSV 3.0

Example 2

In this experiment, a manganese promoted chromium molybdenum catalyst supported on $Cr_2O_3$ was prepared. Here, 80.7 g of colloidal chromia suspension, containing 22 wt.% $Cr_2O_3$ (Nyacol) was diluted to 400 ml, and a solution of 5.1 g $MnSO_4 \cdot H_2O$ in 50 ml deionized water added to it, with stirring. Dropwise addition of a solution of 2.6 g $(NH_4)MoS_4$ in 100 ml water and 25 ml ethylene diamine to the resultant gel, resulted in the formation of the precursor on the surface of the chromia and concomitant precipitation of the composite of precursor and chromia support, which was separated by filtration, washing and drying. Analysis of the dry composite revealed a $Cr_2O_3$ content of over 60 wt.%.

Pelletizing and sulfiding of the resultant solid yielded a catalyst which, upon testing on LCCO over a period of 46 hrs. at a LHSV of 3.5–4.5 produced a $K_{HDS}$ (2nd order) of 2.1 and a $K_{HDN}$ of the same value. The relative HDN vs. HDS reactivity is therefore close to unity.

Example 3

A manganese promoted molybdenum catalyst supported on silica was prepared, in the absence of colloidal chromium oxide, employing a procedure similar to that of Example 2. Thus, 48 grams of colloidal $SiO_2$ (34%) was added to a large three neck flask and diluted to 400 ml with deionized water. To this was added a solution of 2 ml of $H_2SO_4$ and 5.75 grams of $MnSO_4 \cdot H_2O$ in 50 ml of $H_2O$. A separate solution was made by dissolving 8.8 grams of $(NH_4)_2MoS_4$ in a mixture of 100 ml of water and 25 ml of ethylenediamine. This solution was added dropwise, with vigorous stirring, to the large flask containing the manganese sulfate and colloidal silica. An orange precipitate resulted. The resulting solids, 33.55 grams, were washed with $H_2O$ and dried at 50° C. in a vacuum oven. Analysis of the solids revealed an $SiO_2$ content of 68.24%.

Pelletizing and sulfiding of the dry solid yielded a catalyst having a $K_{HDS}$ of only 0.65. There was essentially no hydrodenitrogenation activity.

Example 4

In this experiment, a nickel promoted chromium molybdenum catalyst supported on alumina was prepared by starting with a commercially available catalyst base comprising 19% $Cr_2O_3$ on 81% $Al_2O_3$ as support, and precipitating a nickel chelate thiomolybdate onto this support. The sulfided catalyst contained about 50% $Al_2O_3$, the remainder a mixture of nickel sulfide (about 11%), molybdenum sulfide (about 23%), chromium oxide-sulfide (about 16%).

The composite precursor and support was prepared by placing 32.2 grams of the powdered support material in a flask. In a separate container 17.58 grams of $NiCl_2 \cdot 6H_2O$ were dissolved in 25 ml of $H_2O$ to which 20 ml of ethylenediamine was slowly added to form a nickel-amine complex. The solution of nickel-diamine complex was slowly added to the flask containing the support material with vigorous agitation to form a slurry of support material that appeared to be uniformly coated with the nickel complex. Next, 19.25 grams of $(NH_4)_2MoS_4$ was dissolved in a solution of 100 ml $H_2O$ and 50 ml ethylenediamine. This solution was added dropwise to the slurry with stirring until the slurry was of a uniform color. The slurry was then filtered and dried in a vacuum oven overnight at 50° C.

When this catalyst was tested on LCCO feed in a manner similar to Example 1, at a LHSV of 3.0, 67% HDS and 44% HDN were achieved. Comparing these results with the commercial catalyst data in Table 2 of Example 1, it can be concluded that, at the same desulfurization level, the catalyst of this example would show a much higher degree of denitrogenation.

What is claimed is:

1. A hydrorefining process for reducing the contents of sulfur and nitrogen compounds in a hydrocarbon feed comprising contacting a hydrocarbon feed at elevated temperature of at least about 100° C. and in the presence of hydrogen, with a catalyst consisting essentially of a mixture of (i) an amorphous sulfide of trivalent chromium, (ii) microcrystallites of metal sulfide of a metal selected from the group consisting of Mo, W and mixture thereof and (iii) a sulfide of at least one promoter metal sulfide of a metal selected from the group consisting of Ni, Co, Mn, Zn, Cu and mixture thereof and mixture thereof with Fe, said contacting occurring for a time sufficient to hydrorefine at least a portion of said feed.

2. The process of claim 1 wherein said catalyst exhibits no crystallinity for the chromium sulfide when measured by X-ray diffraction.

3. The process of claim 2 wherein said catalyst contains metal sulfide of at least two promoter metals wherein one of said metals is Fe.

4. The process of either of claims 2 or 3 wherein said microcrystallites of metal sulfide of Mo, W and mixture thereof have major dimensions of less than about 0.1 microns by 0.01 microns.

5. The process of claim 4 wherein said catalyst is prepared heating one or more catalyst precursors, at a temperature of at least about 200° C., in the presence of sulfur or sulfur bearing compound and under oxygen-free conditions for a time sufficient to form said catalyst, wherein said catalyst precursor is formed by mixing a slurry of a hydrated oxide of trivalent chromium with one or more salts containing a thiometallate anion of Mo, W or mixture thereof and a cation comprising at least one divalent promoter metal chelated by at least one neutral, nitrogen-containing polydentate ligand, precipitating the thiometallate salt or salts onto the particles of hydrated chromium oxide and recovering the precursor.

6. The process of claim 5 wherein said ligand is selected from the group consisting of alkyl amines, aryl amines, nitrogen heterocycles and mixtures thereof.

7. The process of claim 6 wherein said ligand is one or more chelating polydentate amines.

8. The process of claim 7 wherein said ligand is one or more alkyl amines.

9. The process of claim 5 wherein said thiometallate anion containing salt is of the general formula (ML)(Mo$_y$W$_{1-y}$S$_4$), wherein M is one or more divalent promoter metals selected from the group consisting of Ni, Co, Mn, Zn, Cu and mixture thereof and mixture thereof with Fe, wherein y is any value ranging from 0 to 1 and L is one or more neutral, nitrogen-containing ligands, at least one of which is a chelating polydentate ligand.

10. The process of claim 4 wherein said precursor is prepared by mixing a slurry of hydrated chromium oxide with a solution of thiometallate salt prepared by dissolving an ammonium or substituted ammonium thiometallate salt of Mo, W or mixture thereof in an excess of one or more neutral, nitrogen-containing ligands, at least one of which is a chelating polydentate ligand and also in the presence of one or more salts of said divalent promoter metal to form a precursor precipitate and recovering said precursor.

11. The process of claim 5 wherein said precursor is formed in the presence of one or more salts containing a thiometallate anion of Mo, W or mixture thereof and a cation comprising the conjugate acid of one or more neutral, nitrogen-containing ligands which do not contain any divalent promoter metals in addition to the promoter metal-containing thiometallate anion containing salt.

12. A process for hydrocracking a hydrocarbon feed which comprises contacting said feed at an elevated temperature of at least about 150° C. and in the presence of hydrogen with a catalyst consisting essentially of a mixture of (i) an amorphous metal sulfide of trivalent chromium, (ii) microcrystallites of metal sulfide of a metal selected from the group consisting of Mo, W and mixture thereof and (iii) a sulfide of at least one promoter metal selected from the group consisting of Ni, Co, Mn, Cu, Zn and mixture thereof, and mixture thereof with Fe, said contacting occurring for a time sufficient to hydrocrack at least a portion of said feed and wherein said catalyst exhibits no crystallinity for the chromium sulfide when measured by X-ray diffraction.

13. The process of claim 11 wherein said catalyst is prepared by heating one or more catalyst precursors, at a temperature of at least about 200° C., in the presence of sulfur or sulfur bearing compound and under oxygen-free conditions for a time sufficient to form said catalyst, wherein said catalyst precursor is formed by mixing a slurry of a hydrated oxide of trivalent chromium with one or more salts containing a thiometallate anion of Mo, W or mixture thereof and a cation comprising at least one divalent promoter metal chelated by at least one neutral, nitrogen-containing polydentate ligand, precipitating the thiometallate salt or salts onto the particles of hydrated chromium oxide and recovering the precursor.

14. A process for removing nitrogen from a nitrogen-containing hydrocarbon feed which comprises contacting said feed at an elevated temperature of at least about 150° C., and in the presence of hydrogen with a catalyst consisting essentially of a mixture of (i) an amorphous sulfide of trivalent chromium, (ii) microcrystallites of metal sulfide of a metal selected from the group consisting of Mo, W and mixture thereof and (iii) a sulfide of a least one promoter metal selected from the group consisting of Ni, Co, Mn, Cu, Zn and mixture thereof, and mixture thereof with Fe, said contacting occurring for a time sufficient to remove at least a portion of nitrogen from said feed.

15. The process of claim 14 wherein said feed is a lube oil feed.

16. A process for improving the oxidation stability of a nitrogen and sulfur containing lube oil feed which comprises contacting said feed at an elevated temperature of at least about 150° C. and in the presence of hydrogen with a catalyst consisting essentially of a mixture of (i) an amorphous sulfide of trivalent chromium, (ii) microcrystallites of metal sulfide of a metal selected from the group consisting of Mo, W and mixture thereof and (iii) a sulfide of at least one promoter metal selected from the group consisting of Ni, Co, Mn, Zn, Cu and mixture thereof and mixture thereof with Fe, said contacting occurring for a time sufficient to improve the oxidation stability of said lube oil.

17. The process of claim 14 wherein said thiometallate anion containing salt is of the general formula (ML)(Mo$_y$W$_{1-y}$S$_4$), wherein M is one or more divalent promoter metal selected from the group consisting of Ni, Co, Mn, Zn, Cu and mixture thereof and mixture thereof with Fe, wherein y is any value ranging from 0 to 1 and L is one or more neutral, nitrogen-containing ligands, at least one of which is a chelating polydentate ligand.

18. The process of either of claims 13 or 17 wherein ligand L is selected from the group consisting of alkyl amines, aryl amines, nitrogen heterocycles and mixtures thereof.

19. The process of claim 18 wherein ligand L is one or more chelating polydentate amines.

20. The process of either of claims 14 or 15 wherein said catalyst is prepared by heating one or more catalyst precursors, at a temperature of at least about 200° C., in the presence of sulfur or sulfur bearing compound and under oxygen-free conditions for a time sufficient to form said catalyst, wherein said catalyst precursor is formed by mixing a slurry of a hydrated oxide of trivalent chromium with one or more salts containing a thiometallate anion of Mo, W or mixture thereof and a cation comprising at least one divalent promoter metal chelated by at least one neutral, nitrogen-containing polydentate ligand, precipitating the thiometallate salt or salts onto the particles of hydrated chromium oxide and recovering the precursor.

21. The process of claim 20 wherein said thiometallate anion containing salt is of the general formula $(ML)(Mo_yW_{1-y}S_4)$, wherein M is one or more divalent promoter metals selected from the group consisting of Ni, Co, Mn, Zn, Cu and mixture thereof and mixture thereof with Fe, wherein y is any value ranging from 0 to 1 and L is one or more neutral, nitrogen-containing ligands, at least one of which is a chelating polydentate ligand.

22. The process of claim 21 wherein ligand L is selected from the group consisting of alkyl amines, aryl amines, nitrogen heterocycles and mixtures thereof.

23. The process of claim 22 wherein ligand L is one or more chelating polydentate amines.

24. The process of claim 16 wherein said catalyst is prepared by heating one or more catalyst precursors, at a temperature of at least about 200° C., in the presence of sulfur or sulfur bearing compound and under oxygen-free conditions for a time sufficient to form said catalyst, wherein said catalyst precursor is formed by mixing a slurry of a hydrated oxide of trivalent chromium with one or more salts containing a thiometallate anion of Mo, W or mixture thereof and a cation comprising at least one divalent promoter metal chelated by at least one neutral, nitrogen-containing polydentate ligand, precipitating the thiometallate salt or salts onto the particles of hydrated chromium oxide and recovering the precursor.

25. The process of claim 24 wherein said thiometallate anion containing salt is of the general formula $(ML)(Mo_yW_{1-y}S_4)$, wherein M is one or more divalent promoter metals selected from the group consisting of Ni, Co, Mn, Zn, Cu and mixture thereof and mixture thereof with Fe, wherein y is any value ranging from 0 to 1 and L is one or more neutral, nitrogen-containing ligands, at least one of which is a chelating polydentate ligand.

26. The process of claim 25 wherein ligand L is selected from the group consisting of alkyl amines, aryl amines, nitrogen heterocycles and mixtures thereof.

27. The process of claim 25 wherein ligand L is one or more chelating polydentate amines.

* * * * *